(12) United States Patent
Lensing et al.

(10) Patent No.: US 6,433,871 B1
(45) Date of Patent: Aug. 13, 2002

(54) METHOD OF USING SCATTEROMETRY MEASUREMENTS TO DETERMINE AND CONTROL GATE ELECTRODE PROFILES

(75) Inventors: Kevin R. Lensing; James Broc Stirton, both of Austin, TX (US)

(73) Assignee: Advanced Micron Devices, Inc., Austin, TX (US)

( * ) Notice: Subject to any disclaimer, the term of this patent is extended or adjusted under 35 U.S.C. 154(b) by 0 days.

(21) Appl. No.: 09/865,821

(22) Filed: May 25, 2001

(51) Int. Cl.[7] ............................................... G01B 11/06
(52) U.S. Cl. ...................................................... 356/381
(58) Field of Search ............................. 255/13; 345/7; 355/53; 438/782; 356/630, 445, 381; 435/6; 422/50

(56) References Cited

U.S. PATENT DOCUMENTS

| | | | |
|---|---|---|---|
| 5,025,296 A | * 6/1991 | Fullerton | 357/23.8 |
| 5,867,276 A | 2/1999 | McNeil et al. | 356/445 |
| 5,877,276 A | 3/1999 | Borden | 356/376 |
| 5,880,838 A | 3/1999 | Marx et al. | 356/351 |
| 6,081,334 A | 6/2000 | Grimbergen et al. | 356/357 |
| 6,100,985 A | * 8/2000 | Scheiner | 356/381 |

* cited by examiner

Primary Examiner—John F. Niebling
Assistant Examiner—Andre C Stevenson
(74) Attorney, Agent, or Firm—Williams, Morgan & Amerson, P.C.

(57) ABSTRACT

A method of using scatterometry measurements to determine and control gate electrode profiles is disclosed. In one embodiment, the method comprises providing a library of optical characteristic traces, each of which correspond to a grating structure comprised of a plurality of gate electrode structures having a known profile, providing a substrate having at least one grating structure formed thereabove, the formed grating structure comprised of a plurality of gate electrode structures having an unknown profile, and illuminating the formed grating structure. The method further comprises measuring light reflected off of the grating structure to generate an optical characteristic trace for the formed grating structure and determining a profile of the gate electrode structures comprising the formed grating structure by correlating the generated optical characteristic trace to an optical characteristic trace from the library. In another embodiment, the method disclosed herein comprises comparing a generated optical characteristic trace of gate electrode structures having an unknown profile to a target trace established for gate electrode structures having an ideal or acceptable profile.

77 Claims, 4 Drawing Sheets

METHOD OF USING SCATTEROMETRY MEASUREMENTS TO DETERMINE AND CONTROL GATE ELECTRODE PROFILES

BACKGROUND OF THE INVENTION

1. Field of the Invention

This invention relates generally to semiconductor fabrication technology, and, more particularly, to a method of using scatterometry measurements to determine and control gate electrode profiles, and a system for accomplishing same.

2. Description of the Related Art

There is a constant drive within the semiconductor industry to increase the operating speed of integrated circuit devices, e.g., microprocessors, memory devices, and the like. This drive is fueled by consumer demands for computers and electronic devices that operate at increasingly greater speeds. This demand for increased speed has resulted in a continual reduction in the size of semiconductor devices, e.g., transistors. That is, many components of a typical field effect transistor (FET), e.g., channel length, junction depths, gate insulation thickness, and the like, are reduced. For example, all other things being equal, the smaller the channel length of the transistor, the faster the transistor will operate. Thus, there is a constant drive to reduce the size, or scale, of the components of a typical transistor to increase the overall speed of the transistor, as well as integrated circuit devices incorporating such transistors.

Figure 1:
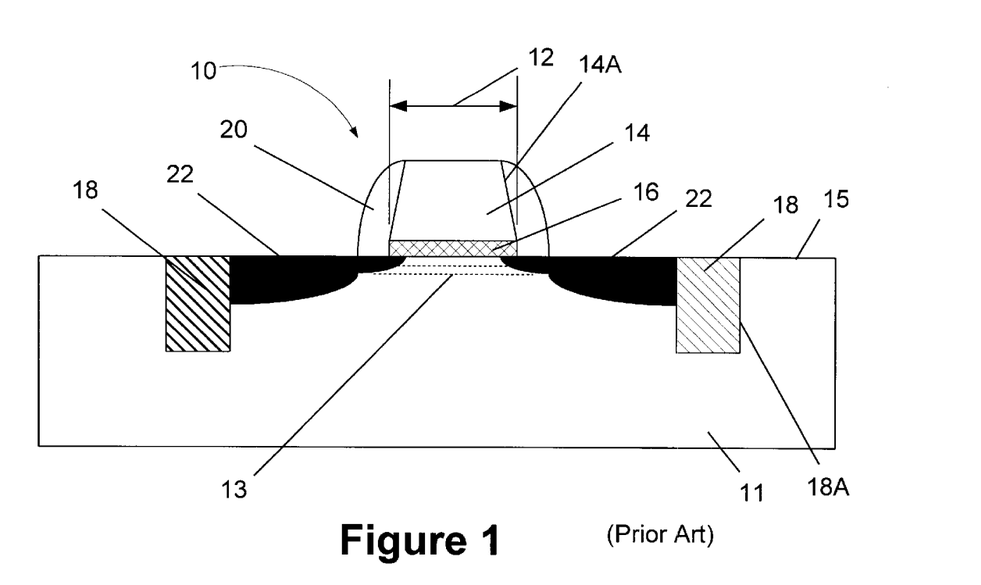
FIG. 1 is a cross-sectional view of an illustrative prior art transistor.

Typically, integrated circuit devices are comprised of hundreds or millions of transistors formed above a semiconducting substrate. By way of background, an illustrative field effect transistor 10, as shown in FIG. 1, may be formed above a surface 15 of a semiconducting substrate or wafer 11 comprised of doped-silicon. The substrate 11 may be doped with either N-type or P-type dopant materials. The transistor 10 may have a doped polycrystalline silicon (polysilicon) gate electrode 14 formed above a gate insulation layer 16. The gate electrode 14 and the gate insulation layer 16 may be separated from doped source/drain regions 22 of the transistor 10 by a dielectric sidewall spacer 20. The source/drain regions 22 for the transistor 10 may be formed by performing one or more ion implantation processes to introduce dopant atoms, e.g., arsenic or phosphorous for NMOS devices, boron for PMOS devices, into the substrate 11. Shallow trench isolation regions 18 may be provided to isolate the transistor 10 electrically from neighboring semiconductor devices, such as other transistors (not shown). Additionally, although not depicted in FIG. 1, a typical integrated circuit device is comprised of a plurality of conductive interconnections, such as conductive lines and conductive contacts or vias, positioned in multiple layers of insulating material formed above the substrate 11.

The gate electrode 14 has a critical dimension 12, i.e., the width of the gate electrode 14, that approximately corresponds to the channel length 13 of the device when the transistor 10 is operational. Of course, the critical dimension 12 of the gate electrode 14 is but one example of a feature that must be formed very accurately in modem semiconductor manufacturing operations. Other examples include, but are not limited to, conductive lines, openings in insulating layers to allow subsequent formation of a conductive interconnection, i.e., a conductive line or contact, therein, etc.

One illustrative process flow for forming the illustrative transistor 10 will now be described. Initially, the shallow trench isolation regions 18 are formed in the substrate 11 by etching trenches 18A into the substrate 11 and, thereafter, filling the trenches 18A with an appropriate insulating material, e.g., silicon dioxide. Next, a gate insulation layer 16 is formed on the surface 15 of the substrate 11 between the trench isolation regions 18. This gate insulation layer 16 may be comprised of a variety of materials, but it is typically comprised of a thermally grown layer of silicon dioxide. Thereafter, the gate electrode 14 for the transistor 10 is formed by forming a layer of gate electrode material, typically polysilicon, above the gate insulation layer 16, and patterning the layer of gate electrode material using known photolithography and etching techniques to thereby define the gate electrode 14. The sidewalls 14A of the gate electrode 14 tend to flare outwardly a very small amount. Of course, millions of such gate electrodes are being formed across the entire surface of the substrate 11 during this patterning process. The source/drain regions 22 and the sidewall spacers 20 are then formed using a variety of known techniques. Additionally, metal silicide regions (not shown) may be formed above the gate electrode 14 and the source/drain regions 18.

Figure 2A:
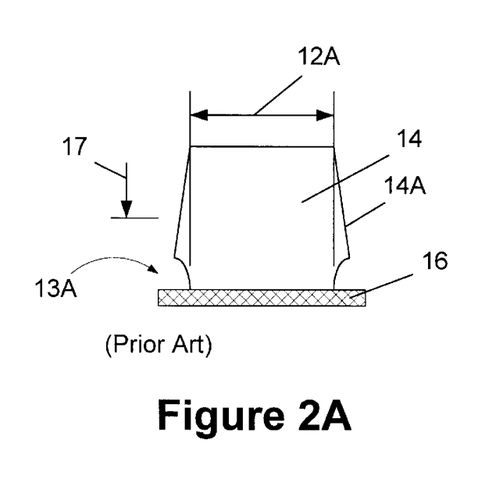
FIGS. 2A–2B are cross-sectional views depicting illustrative profiles of gate electrode structures.
Figure 2B:
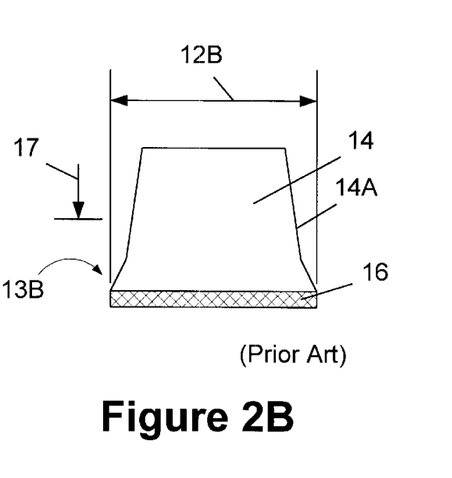

As set forth previously, the critical dimension 12 of the gate electrode 14 is very important in that it, to a great extent, affects many performance characteristics of the completed transistors, e.g., switching speed, leakage currents, etc. FIGS. 2A–2B depict illustrative profiles of gate electrodes 14 for purposes of explanation. The gate electrode 14 in FIGS. 2A depicts a condition referred to as undercutting (region 13A) while the profile in FIG. 2B depicts a condition referred to as flaring or footing (region 13B). The extent of undercutting and footing depicted in FIGS. 2A and 2B, respectively, are exaggerated for purposes of explanation. These problems typically result from the use of a two-step etching process to pattern the gate electrode 14. That is, an initial anisotropic etching process is typically performed to etch through approximately 70–80% of the thickness of the gate electrode layer (a so-called main etch), and a second isotropic etch process is used to complete the etching of the gate electrode layer (a so-called soft landing etch). Such a two-step etching process is performed in an effort to insure that the underlying gate insulation layer 16 is not damaged.

Both undercutting and footing can be problematic in modem integrated circuit devices for a number of reasons. For example, transistors with gate electrodes 14 that exhibit undercutting tend to have a smaller cross-sectional area as compared to an ideal target cross-sectional area and, thus, tend to exhibit larger leakage currents. On the other hand, transistors with gate electrodes 14 that exhibit footing tend to have a larger cross-sectional area than anticipated, and such transistors tend to operate at slower than anticipated speeds.

Typically, after the gate electrode structures 14 are formed, a scanning electron microscope (SEM) may be employed to obtain information about the critical dimensions 12 of the gate electrode structure 14. However, due to the close proximity of the millions of gate electrode structures 14, and the inherent nature of the SEM, the data obtained by the SEM does not reveal the condition of the gate electrode 14 in the area adjacent the gate insulation layer 16. That is, due to excessive noise and interference, the SEM can only be used to see down to about the midthickness point 17 of the gate electrode 14. Thus, the profile of the gate electrode 14 adjacent the gate insulation layer 16 cannot readily be examined using an SEM. Typically, one or more production or test wafers that are representative of one or more lots of wafers are eventually cross-sectioned and analyzed to detect the existence of under cutting or footing problems. However, it takes days or weeks to generate results from such destructive testing techniques. During this time, additional gate structures 14 may be being manufactured on additional wafers with undesirable undercutting and footing characteristics. Moreover, the results of such destructive testing techniques are not provided in sufficient time to provide meaningful and relatively rapid feedback to allow more precise control of the processing parameters used to form the gate electrode structures 14.

The present invention is directed to a method and system that may solve, or at least reduce, some or all of the aforementioned problems.

SUMMARY OF THE INVENTION

The present invention is generally directed to a method of using scatterometry measurements to determine and control gate electrode profiles. In one illustrative embodiment, the method comprises providing a library of optical characteristic traces, each of which correspond to a grating structure comprised of a plurality of gate electrode structures having a known profile, providing a substrate having at least one grating structure formed thereabove, the formed grating structure comprised of a plurality of gate electrode structures having an unknown profile, and illuminating the grating structure formed above the substrate. The method further comprises measuring light reflected off of the grating structure to generate an optical characteristic trace for the formed grating structure and determining a profile of the gate electrode structures comprising the formed grating structure by correlating the generated optical characteristic trace to an optical characteristic trace from the library. In a further embodiment, the method comprises modifying at least one parameter of at least one etching process used to form gate electrode structures on a subsequently processed substrate based upon the determined profile of the gate electrode structures comprising the formed grating structure. In yet a further embodiment, the library is comprised of a first plurality of traces corresponding to a grating structure comprised of gate electrode structures having a profile that exhibits undercutting, and a second plurality of traces corresponding to a grating structure comprised of gate electrode structures having a profile that exhibits footing.

In another aspect, the present invention is directed to a method whereby a generated trace of a grating structure comprised of a plurality of gate electrode structures having an unknown profile is compared to a target trace established for a grating structure comprised of gate electrode structures having an acceptable profile. In one illustrative embodiment, the method comprises providing a library comprised of at least one optical characteristic trace, one of which is a target trace that corresponds to a grating structure comprised of a plurality of gate electrode structures having a known target profile, and providing a substrate having at least one grating structure formed thereabove, the formed grating structure comprised of a plurality of gate electrode structures having an unknown profile. The method further comprises illuminating the grating structure formed above the substrate, measuring light reflected off of the grating structure to generate an optical characteristic trace for the formed grating structure, and comparing the generated optical characteristic trace to the target trace. In a further embodiment, the method further comprises determining, based upon the comparison of the generated optical characteristic trace and the target trace, at least one parameter of at least one etching process used to form gate electrode structures on a subsequently processed substrate.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached figures. Although the various regions and structures of a semiconductor device are depicted in the drawings as having very precise, sharp configurations and profiles, those skilled in the art recognize that, in reality, these regions and structures are not as precise as indicated in the drawings. Additionally, the relative sizes of the various features and doped regions depicted in the drawings may be exaggerated or reduced as compared to the size of those features or regions on fabricated devices. Nevertheless, the attached drawings are included to describe and explain illustrative examples of the present invention.

In general, the present invention is directed to a method of using scatterometry measurements to determine and control gate electrode profiles, and a system for accomplishing same. As will be readily apparent to those skilled in the art upon a complete reading of the present application, the present method is applicable to a variety of technologies, e.g., NMOS, PMOS, CMOS, etc., and it is readily applicable to a variety of devices, including, but not limited to, logic devices, memory devices, etc.

Semiconductor manufacturing generally involves multiple processes whereby multiple layers of material are formed above a semiconducting substrate, and portions of those layers are selectively removed until such time as a completed device is formed. In general, photolithography involves the process of forming a layer of photoresist material above one or more process layers in which a feature, e.g, a metal line, a gate electrode, an opening in a layer of insulating material, will be formed. Thereafter, a pattern that is desired to be transferred into the underlying process layer or layers will be formed in the layer of photoresist material. Then, using one or more etching processes, the underlying process layer is etched using the patterned layer of photoresist as a mask, thereby resulting in a patterned process layer that replicates the pattern formed in the layer of photoresist.

In general, in one embodiment, the present invention involves the formation of a plurality of gate electrode structures 14, taking scatterometric measurements of those gate electrode structures 14 to determine the profile of the gate electrode structure 14, and determining one or more parameters of an etching process to be used to form additional gate electrode structures 14 on one or more subsequently processed substrates.

Figure 3A:
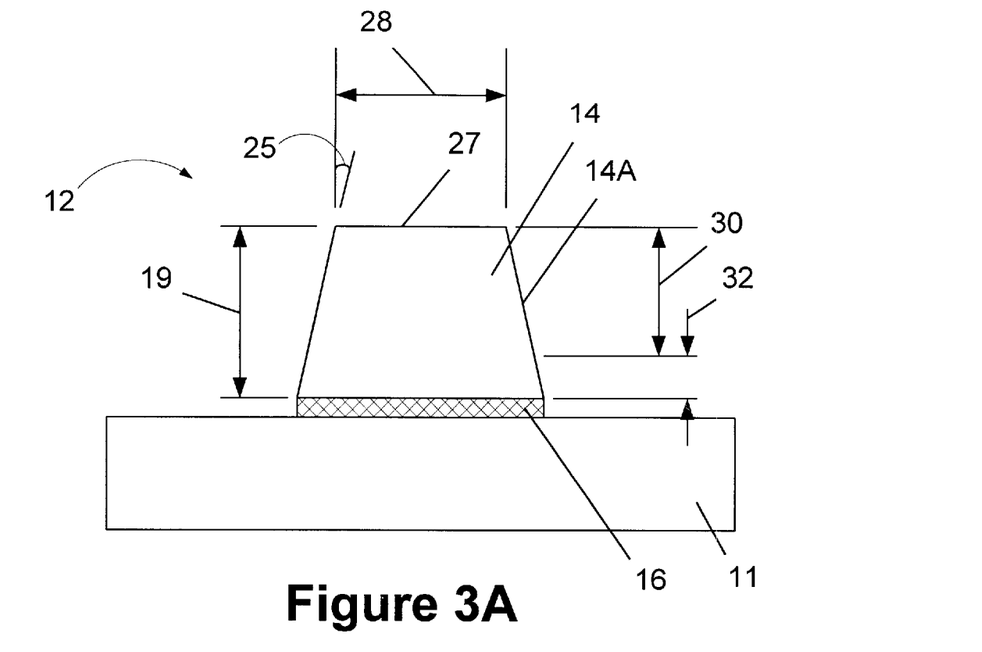
FIGS. 3A–3C are cross-sectional views of an illustrative gate electrode structure with differing profiles.
Figure 3B:
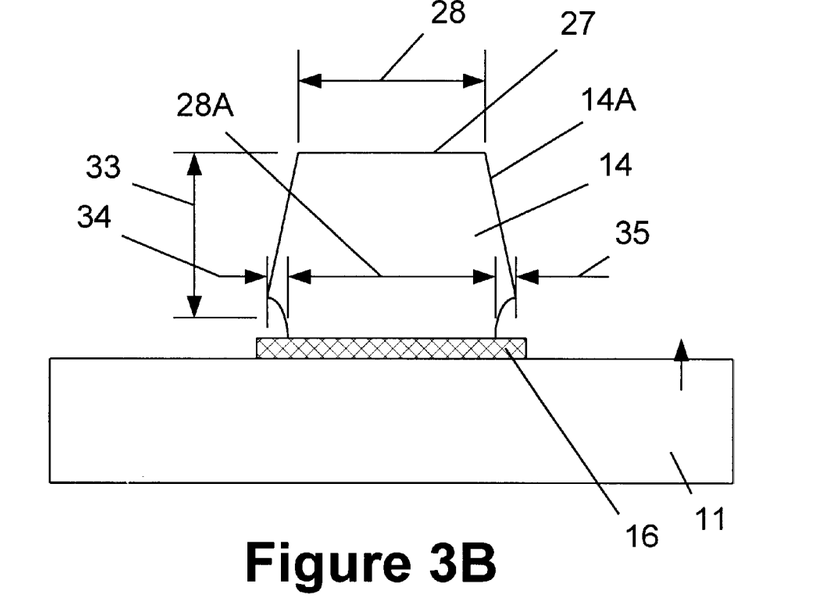
Figure 3C:
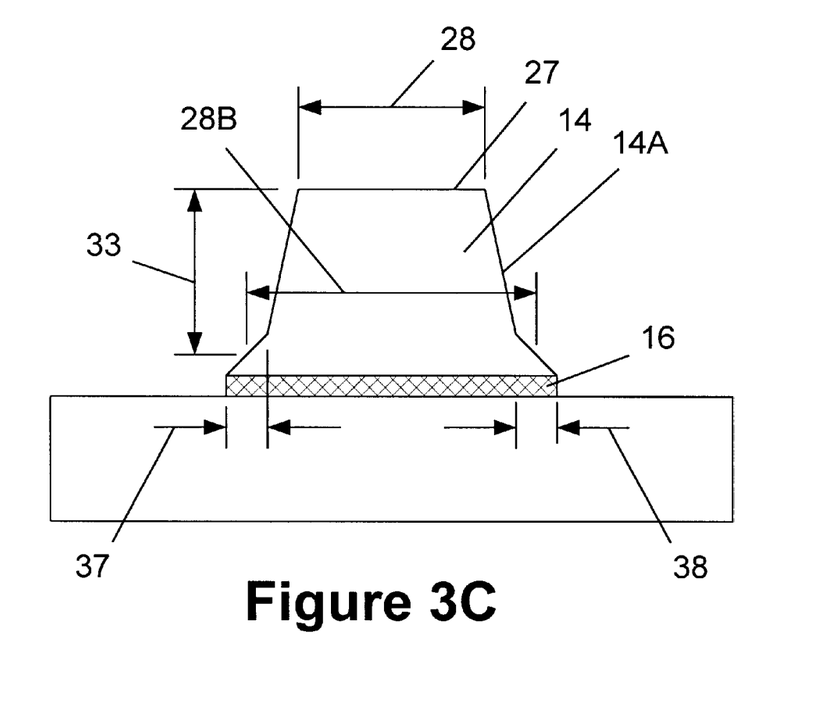

FIGS. 3A—3C depict gate electrode structures 14 with differing profiles, i.e., cross-sectional configurations. The gate electrode structure 14 depicted in FIG. 3A represents an ideal or targeted gate electrode profile 14. FIGS. 3B and 3C depict a gate electrode structure 14 with undercutting and footing characteristics, respectively. As shown in FIG. 3A, a gate electrode structure 14 and a gate insulation layer 16 are formed above a semiconducting substrate or wafer 11. The gate electrode 14 has sidewalls 14A, a top surface 27, and a width 28 at the top surface 27 of the gate electrode 14. In some embodiments, a layer of metal silicide may be formed above the gate electrode 14, although that structure is not depicted in the attached drawings. The gate electrode structure 14 and the gate insulation layer 16 may be comprised of a variety of materials, and they may be formed using a variety of known processing techniques. In one illustrative embodiment, the gate insulation layer 16 is comprised of a thermally grown layer of silicon dioxide having a thickness ranging from approximately 1.5–5 nm, and the gate electrode 14 is comprised of polysilicon, and it has a thickness 19 that ranges from approximately 150–400 nm.

In one illustrative process flow, the gate electrode structures 14 depicted in FIGS. 3A–3C may be formed by performing a two-step etching process on a layer of material from which the gate electrode structure 14 will be formed. For example, an initial timed, anisotropic etching process may be used to etch through approximately 75% of the thickness of the gate electrode 14, as indicated by the dimension 30 (see FIG. 3A). Thereafter, a second, endpoint etching process that is substantially isotropic in nature may be used to remove the remaining portion of the gate electrode layer in the range indicated by the dimension 32. The second etching process is highly selective with respect to the material comprising the gate insulation layer 16 to insure integrity of the gate insulation layer 16. For example, in the example where the gate electrode 14 is comprised of polysilicon, the initial timed etching process may be performed using hydrogen bromide, carbon tetrafluoride ($CF_4$) and chlorine, whereas the second endpoint process may be performed using only hydrogen bromide. The second etching process may be endpointed using known spectral analysis techniques that analyze the composition of the off-gases of the etching process. The sidewalls 14A of the gate electrode structures 14 are slightly tapered, as represented by the angle 25, on the order of 2–3 degrees due to the nature of the etching processes employed. Ideally, the sidewalls 14A have essentially no taper, but current etching processes cannot readily and repeatedly produce such ideal structures.

As stated previously, the gate electrode structure 14 depicted in FIG. 3A represents an ideal or target gate electrode profile, i.e., a gate electrode structure 14 exhibiting little or no undercutting or footing. The gate electrode structure 14 in FIG. 3B exhibits undercutting. The gate electrode structure 14 in FIG. 3B has a width 28A at a point that equates to approximately 90% of the thickness of the gate electrode structure 14, as represented by the dimension 33. Stated another way, the total undercutting of the gate electrode structure 14 in FIG. 3B equals the sum of the dimensions 34 and 35. Although depicted in the drawing as being approximately symmetrical, the values for the dimensions 34 and 35 may be different, and they may vary over a range of values. The dimensions 33, 34 and 35 may be taken at or from any desired reference point.

The gate electrode structure 14 depicted in FIG. 3C has a profile that exhibits footing or flaring. The gate electrode structure 14 in FIG. 3B has a width 28B at the approximately 90% thickness depth of the gate electrode, as indicated by the dimension 36. The total footing of the gate electrode structure 14 depicted in FIG. 3C is the sum of the dimensions 37 and 38. The footing of the gate electrode 14 in FIG. 3C is depicted to be symmetrical. However, those skilled in the art will understand and recognize that such footing may be asymmetrical and the values for the dimensions 37 and 38 may be different and have a wide range of values.

Figure 4A:
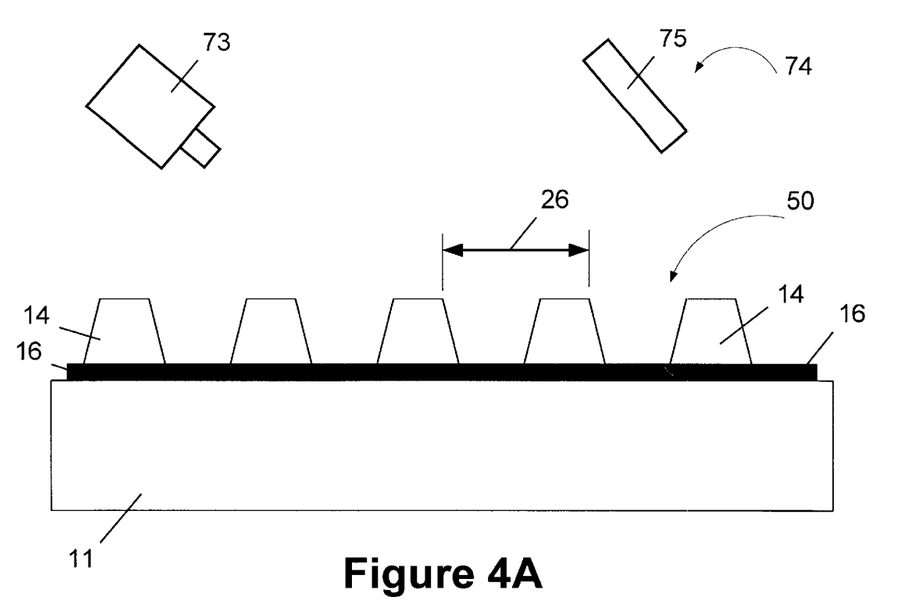
FIGS. 4A–4B depict an illustrative grating structure comprised of a plurality of gate electrode structures, and scatterometry tool illuminating such structures in accordance with one aspect of the present invention.
Figure 4B:
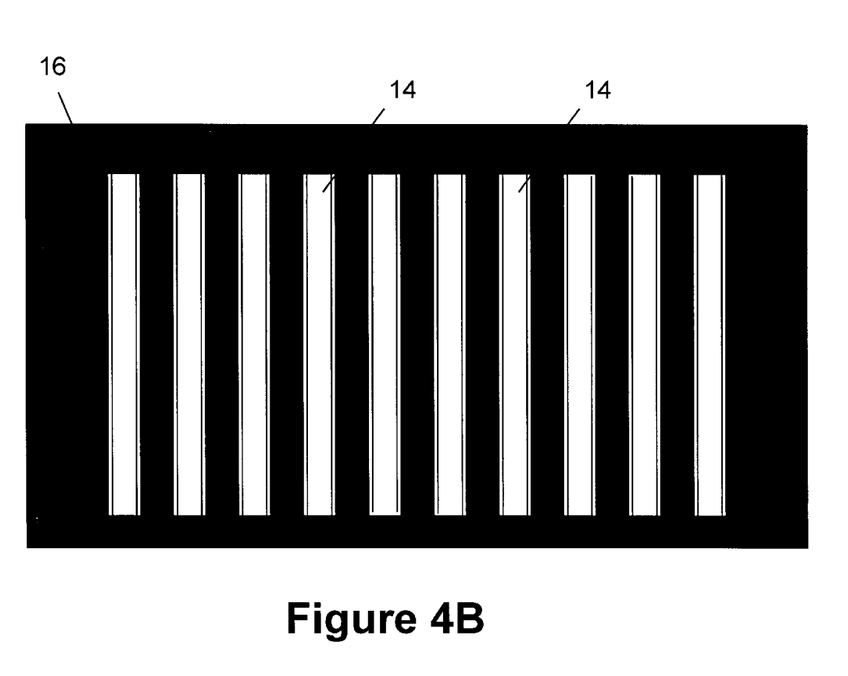

In one embodiment, as shown in FIGS. 4A–4B, the present invention involves the formation of a plurality of gate electrode structures 14 to define a grating structure 50. The gate electrode structures 14 comprising the grating structure 50 may have a pitch 26 that varies from approximately 400–1000 nm. The grating structure 50 may be formed in the scribe line of a wafer 11, and the grating structure 50 will be formed at the same time the gate electrode structures 14 are being formed for production devices formed on the wafer 11. A plurality of such grating structures 50 may be formed at various locations across a surface of a wafer 11. Depending upon the type of integrated circuit device under consideration, and/or as a matter of design choice, the grating structure(s) 50 may be comprised of gate electrode structures 14 that can be part of actual production integrated circuit devices. For example, for memory devices, the gate electrode structures 14 comprising the grating structure 50 may be gate electrode structures 14 that are part of the completed memory device. The size, shape and configuration of the grating structure 50 may be varied as a matter of design choice. For example, the grating structure 50 may be formed in an area having approximate dimensions of 100 $\mu$m×120 $\mu$m, and it may be comprised of approximately 500–1500 gate electrode structures 14 (depending upon the selected pitch).

Also depicted in FIG. 4A is an illustrative scatterometry tool 74 comprised of a representative light source 73 and a detector 75. Ultimately, the grating structure 50 will be measured using scatterometric techniques, and these measurements will be used to determine and/or confirm the profile of the gate electrodes 14 comprising the grating structure 50. Moreover, the scatterometry measurements may be used to determine, confirm and/or control one or more parameters of an etching process used to form gate electrode structures 14 on one or more subsequently processed wafers.

Figure 5:
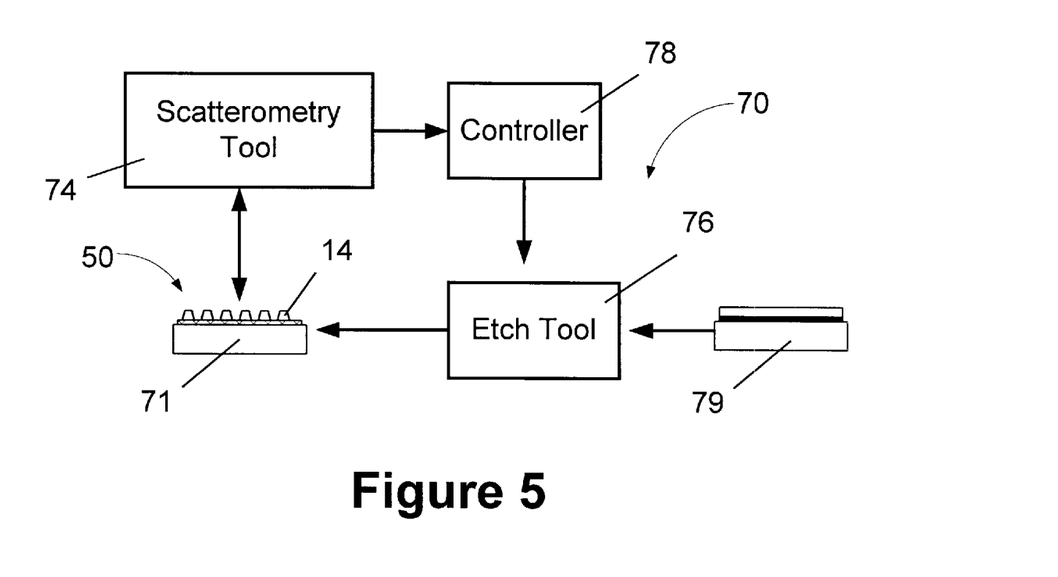
FIG. 5 depicts an illustrative embodiment of a system in accordance with one embodiment of the present invention.

An illustrative system 70 that may be used in one embodiment of the present invention is shown in FIG. 5. The system 70 is comprised of a scatterometry tool 74, an etch tool 76, and a controller 78. As indicated in FIG. 5, the wafer 71 is representative of one or more wafers that has previously been processed in the etch tool 76. The wafers 71 have a grating structure 50 comprised of a plurality of gate electrodes 14 formed thereabove. The wafer 79 represents wafers that are yet to be processed in the etch tool 76.

A variety of scatterometry tools 74 may be used with the present invention, e.g. so-called $2_\theta$-type systems and lens-type scatterometry tools. The scatterometry tool 74 may use white light, or some other wavelength or combination of wavelengths, depending on the specific implementation. Typically, the scatterometry tool 74 will generate an incident beam that has a wide spectral composition and wherein the intensity of the light changes slowly in comparison to changes in wavelength. The angle of incidence of the light may also vary, depending on the specific implementation. The profile traces generated by the scatterometry tool 74 may be based upon a comparison of light intensity to wavelength (for white light, fixed angle type scatterometry tools) or a comparison of intensity to incident angle (for angle resolved systems that use a single light source).

Through use of scatterometry, a characteristic signature or profile trace, associated with a particular profile of the gate electrode structures 14, may be calculated (using Maxwell's equations) for a vast variety, if not all, possible combinations of profiles readily anticipated by the design process. These profile traces may be stored in a library. The scatterometry profile trace may be based on a variety of characteristics of the gate electrode structures 14. For example, with reference to FIGS. 3B–C, the optical characteristic trace may be based upon a ratio of the width 28 of the gate electrode 14 at the top surface 27 as compared to the width of the gate electrode structure 14 at a depth that equates to approximately 90% of the thickness of the gate electrode structure 14. Other characteristics such as the total amount of undercutting, as indicated by the sum of the dimensions 34, 35, the total amount of footing, as indicated by the sum of the dimensions 37, 38, or the area of the gate electrode structures may also be used as the basis for the optical characteristic traces for the gate electrode profiles.

Variations in one or more of the characteristics of the gate electrode profile will cause a significant change in the diffraction characteristics of the incident light from the light source 73 of the scatterometry tool 74. Thus, using Maxwell's equations, a unique profile trace may be established for each unique gate electrode profile anticipated by the design process. A library of profile traces corresponding to each anticipated gate electrode profile may be calculated and stored in a library. Through this technique, each trace in the library represents a grating structure 50 comprised of gate electrode structures 14 having a known profile. If desired, the profiles of the gate electrode structures 14 for each of the traces in the library of gate electrode profile traces may be confirmed using a variety of destructive metrology tests. For example, the actual profile of the gate electrode structure 14 represented by a trace in the library may be confirmed by cross-sectioning the gate electrode structure 14 and observing and measuring characteristics of the profile of the gate electrode structure 14 using a scanning electron microscope. Obviously, the number of gate electrode profiles used to create the library may vary as a matter of design choice. Moreover, the larger the number of profiles, the larger will be the library containing the profiles.

The present invention may be employed to correlate or match a measured or generated profile trace of a grating structure 50 comprised of a plurality of gate electrode structures 14 having an unknown profile to a library of such profiles, each of which corresponds to a grating structure 50 comprised of gate electrode structures 14 having a particular known profile. That is, in one embodiment, the scatterometry tool 74 is used to measure and generate a profile trace for a given grating structure 50 comprised of a plurality of gate electrode structures 14 of an unknown profile. The scatterometry tool 74 may measure one or more grating structures 50 on a given wafer in a lot or even generate a profile trace for each grating structure 50 in the lot, depending on the specific implementation. Moreover, the profile traces from a sample of the grating structures 50 may be averaged or otherwise statistically analyzed. The scatterometry tool 74 (or some other controller resident within the manufacturing plant, e.g., controller 78) compares the measured profile trace (i.e., individual or averaged) to a library of profile traces with known gate electrode profiles to correlate or approximately match the current measured profile trace with a trace in the library. When a match is confirmed, the scatterometry tool 74 (or other controller) may then provide data as to the profile of the gate electrode structure 14 in the measured grating structure 50. For example, the scatterometry tool 74 may output data, based upon the matched profile trace in the library, indicating that the gate electrode structures 14 in the measured grating structure 50 have a width (28A or 28B) at the 90% thickness depth of a certain value. Alternatively, the data output may express a ratio between the width at the 90% thickness depth as compared to the width 28 at the top surface 27 of the gate electrode structures 14. A variety of data output criteria and format are possible.

Based upon these comparisons, the previously unknown profile of the gate electrode structures 14 comprising the measured grating structure 50 may be determined. Additionally, based upon the determined profile of the gate electrode structures 14, the controller 78, if needed, may adjust one or more parameters of an etching process to be performed on subsequently processed wafers 79 in the etch tool 76. For example, one or more parameters, such as gas composition, gas flow rates, pressure, temperature, the ratio of main etch to soft landing etch times, etc., may be varied.

In another embodiment, the measured or generated trace of the grating structure 50 may be compared to a target trace selected from the library for a grating structure 50 comprised of gate electrode structures 14 having a known and desired, or acceptable, target profile. For example, a target trace may be calculated for a grating structure 50 comprised of gate electrode structures 14 having an ideal or acceptable profile using Maxwell's equations, and that target trace may be stored in the library. Thereafter, a measured trace of a grating structure 50 comprised of gate electrode structures 14 having an unknown profile are compared to the target trace. Based upon this comparison, a relatively rough approximation of the quality of the process performed may be determined. That is, by comparing the measured trace to the target trace, it may be determined if the process is producing gate electrode structures 14 having a profile sufficiently close to the ideal or acceptable profile such that further matching of the measured trace with an additional trace from the library is unwarranted. Using this technique, an initial determination may be made as to the acceptability of the profile of the gate electrode structures 14 as compared to a target profile. Of course, this step may be performed in addition to the matching or correlating of a measured trace to a trace from the library as described above. Thus, one particularly illustrative embodiment of the present invention involves performing a rough pass/fail test comparing the sample profile to a "golden" or target profile. Only failing profiles move on to full profile matching, followed by manipulation of the duration of the main etch and/or soft landing etch. For example, using a means squared error analytical to compare the measured spectra to the target trace, if the difference between the two spectra exceed a preselected value or range of values, then the measured trace fails, and additional matching may be performed.

The optical measurements of the grating structure 50 may be performed on any desired number of grating structures 50 and wafers. For example, such measurements may be performed on all wafers in one or more lots, or on a representative number of wafers in a given lot, and these results may then be used to determine or vary one or more parameters, e.g., process gases, flow rates, pressure, temperature, ratio of main etch to soft landing etch times, etc., of the etching process performed in the etch tool 76 on one or more subsequently processed wafers. A single substrate 11 may combine a plurality of grating structures 50, and they may be spaced out above the surface of the substrate.

Control equations may be employed to adjust the operating recipe of the etch tool 76 in situations where the methods described herein indicate that an adjustment is warranted. The control equations may be developed empirically using commonly known linear or nonlinear techniques. The controller 78 may automatically control the operating recipes of the etch tool 76 used to perform one or more etching processes on the subsequently processed wafers 79. Through use of the present invention, the extent and magnitude of variations in gate electrode profiles may be reduced.

In the illustrated embodiments, the controller 78 is a computer programmed with software to implement the functions described herein. Moreover, the functions described for the controller 78 may be performed by one or more controllers spread through the system. For example, the controller 78 may be a fab level controller that is used to control processing operations throughout all or a portion of a semiconductor manufacturing facility. Alternatively, the controller 78 may be a lower level computer that controls only portions or cells of the manufacturing facility. Moreover, the controller 78 may be a stand-alone device, or it may reside on the etch tool 76. However, as will be appreciated by those of ordinary skill in the art, a hardware controller (not shown) designed to implement the particular functions may also be used.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the actions and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

An exemplary software system capable of being adapted to perform the functions of the controller 78, as described, is the Catalyst system offered by KLA Tencor, Inc. The Catalyst system uses Semiconductor Equipment and Materials International (SEMI) Computer Integrated Manufacturing (CIM) Framework compliant system technologies, and is based on the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI.

The present invention is generally directed to a method of using scatterometry measurements to determine and control gate electrode profiles. In one illustrative embodiment, the method comprises providing a library of optical characteristic traces, each of which correspond to a grating structure 50 comprised of a plurality of gate electrode structures 14 having a known profile, providing a substrate 11 having at least one grating structure 50 formed thereabove, the formed grating structure 50 being comprised of a plurality of gate electrode structures 14 having an unknown profile, and illuminating the grating structure 50 formed above the substrate 11. The method further comprises measuring light reflected off of the grating structure 50 to generate an optical characteristic trace for the formed grating structure 50 and determining a profile of the gate electrode structures 14 comprising the formed grating structure 50 by correlating or matching the generated optical characteristic trace to an optical characteristic trace from the library. In a further embodiment, the method comprises modifying at least one parameter of at least one etching process used to form gate electrode structures on a subsequently processed substrate based upon the determined profile of the gate electrode 14 structures comprising the formed grating structure 50. In yet a farther embodiment, the library comprises a first plurality of traces corresponding to a grating structure 50 comprised of gate electrode structures 14 having a profile that exhibits undercutting, and a second plurality of traces corresponding to a grating structure 50 comprised of gate electrode structures 14 having a profile that exhibits footing.

In another aspect, the present invention is directed to a method of comparing a generated optical characteristic trace to a target trace. In one illustrative embodiment, the method comprises providing a library comprised of at least one optical characteristic trace, one of which is a target trace that corresponds to a grating structure comprised of a plurality of gate electrode structures having a known target profile, and providing a substrate having at least one grating structure formed thereabove, the formed grating structure comprised of a plurality of gate electrode structures having an unknown profile. The method further comprises illuminating the grating structure formed above the substrate, measuring light reflected off of the grating structure to generate an optical characteristic trace for the formed grating structure, and comparing the generated optical characteristic trace to the target trace. In a further embodiment, the method comprises determining, based upon the comparison of the generated optical characteristic trace and the target trace, at least one parameter of at least one etching process used to form gate electrode structures on a substantially processed substrate. In yet a further embodiment, the method comprises modifying, based upon the comparison of the generated optical characteristic trace and the target trace, at least one parameter of at least one etching process used to form gate electrode structures on a subsequently processed substrate. That is, the duration of the main etch and/or soft landing etch processes may be varied.

The present invention is also directed to a system for accomplishing the illustrative methods described herein. In one embodiment, the system 70 is comprised of a scatterometry tool 74, an etch tool 76 and a controller 78. The scatterometry tool 74 is adapted to make scatterometric measurements of a grating structure 50 comprised of a plurality of gate electrode structures 14 having an unknown profile and generate an optical characteristic trace for the grating structure 50. The scatterometry tool 74 may be further used to compare the generated optical characteristic trace to a target optical characteristic trace (from the library) or to correlate or match the generated optical characteristic trace to an optical trace in the library. The controller 78 may then be used to control one or more parameters of one or more etching processes used in forming gate electrode structures 14 on subsequently processed wafers.

Through use of the present invention, better process control may be achieved in modern integrated circuit manufacturing facilities. Additionally, the present invention may enable more precise formation of gate electrode structures of transistors employed in integrated circuit devices, thereby improving device performance and increasing production yields.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of determining gate electrode profiles, comprising:

providing a library of optical characteristic traces, each of which correspond to a grating structure comprised of a plurality of gate electrode structures having a known profile;

providing a substrate having at least one grating structure formed thereabove, said formed grating structure comprised of a plurality of gate electrode structures having an unknown profile;

illuminating said grating structure formed above said substrate;

measuring light reflected off of said grating structure to generate an optical characteristic trace for said formed grating structure;

determining a profile of said gate electrode structures comprising said formed grating structure by correlating said generated optical characteristic trace to an optical characteristic trace from said library; and modifying at least one parameter of at least one etching process used to form gate electrode structures on a subsequently processed substrate based upon the determined profile of said gate electrode structures comprising said formed grating structure.

2. A method of determining gate electrode profiles, comprising:

providing a library of optical characteristic traces, each of a first plurality of said traces corresponding to a grating structure comprised of gate electrode structures having a profile that exhibits undercutting, and each of a second plurality of said traces corresponding to a grating structure comprised of gate electrode structures having a profile that exhibits footing;

providing a substrate having at least one grating structure formed thereabove, said formed grating structure comprised of a plurality of gate electrode structures having an unknown profile;

illuminating said grating structure formed above said substrate;

measuring light reflected off of said grating structure to generate an optical characteristic trace for said formed grating structure;

determining a profile of said gate electrode structures comprising said formed grating structure by correlating said generated optical characteristic trace to an optical characteristic trace from said library.

3. A method of determining gate electrode profiles, comprising:

providing a library of optical characteristic traces, each of which correspond to a grating structure comprised of a plurality of gate electrode structures having a known profile;

providing a substrate having at least one grating structure formed in a scribe line of said substrate, said formed grating structure comprised of a plurality of gate electrode structures having an unknown profile;

illuminating said grating structure formed above said substrate;

measuring light reflected off of said grating structure to generate an optical characteristic trace for said formed grating structure; and determining a profile of said gate electrode structures comprising said formed grating structure by correlating said generated optical characteristic trace to an optical characteristic trace from said library.

4. The method of claim 1, wherein modifying at least one parameter of at least one etching process used to form gate electrode structures on a subsequently processed substrate comprises modifying at least one of a gas composition, a gas flow rate, a temperature, a pressure and a duration of said at least one etching process.

5. The method of claim 1, wherein modifying at least one parameter of at least one etching process used to form gate electrode structures on a subsequently processed substrate comprises modifying a duration of at least one of a main etch process and a soft landing etch process.

6. The method of claim 1, wherein modifying at least one parameter of at least one etching process used to form gate electrode structures on a subsequently processed substrate comprises modifying at least one parameter of a two-step etching process.

7. A method of determining gate electrode profiles, comprising:

providing a library of optical characteristic traces, each of which correspond to a grating structure comprised of a plurality of gate electrode structures having a known profile;

providing a substrate having at least one grating structure formed in a scribe line of said substrate, said formed grating structure comprised of a plurality of gate electrode structures having an unknown profile;

illuminating said grating structure formed above said substrate, wherein said grating structure formed above said provided substrate is formed in an area having dimensions of approximately 100×120 $\mu$m;

measuring light reflected off of said grating structure to generate an optical characteristic trace for said formed grating structure; and determining a profile of said gate electrode structures comprising said formed grating structure by correlating said generated optical characteristic trace to an optical characteristic trace from said library.

8. A method of determining gate electrode profiles, comprising:

providing a library of optical characteristic traces, each of which correspond to a grating structure comprised of a plurality of gate electrode structures having a known profile;

providing a substrate having at least one grating structure formed thereabove, said formed grating structure comprised of a plurality of gate electrode structures having an unknown profile;

illuminating said grating structure formed above said substrate;

measuring light reflected off of said grating structure to generate an optical characteristic trace for said formed grating structure;

determining a profile of said gate electrode structures comprising said formed grating structure by correlating said generated optical characteristic trace to an optical characteristic trace from said library; and modifying at least one parameter of at least one etching process used to form gate electrode structures on a subsequently processed substrate based upon the determined profile of said gate electrode structures comprising said formed grating structure.

9. The method of claim 8, wherein providing a library of optical characteristic traces comprises providing a library of optical characteristic traces, each of a first plurality of said traces corresponding to a grating structure comprised of gate electrode structures having a profile that exhibits undercutting, and each of a second plurality of said traces corresponding to a grating structure comprised of gate electrode structures having a profile that exhibits footing.

10. The method of claim 8, wherein providing a substrate having at least one grating structure formed thereabove comprises providing a substrate having at least one grating structure formed in a scribe line of said substrate.

11. The method of claim 8, wherein providing a substrate having at least one grating structure formed thereabove comprises providing a substrate having at least one grating structure formed in a production die formed above said substrate.

12. The method of claim 8, wherein providing a substrate having at least one grating structure formed thereabove comprises providing a substrate having a plurality of grating structures formed thereabove.

13. The method of claim 9, wherein modifying at least one parameter of at least one etching process used to form gate electrode structures on a subsequently processed substrate comprises modifying at least one of a gas composition, a gas flow rate, a temperature, a pressure and a duration of said at least one etching process.

14. The method of claim 9, wherein modifying at least one parameter of at least one etching process used to form gate electrode structures on a subsequently processed substrate comprises modifying a duration of at least one of a main etch process and a soft landing etch process.

15. The method of claim 9, wherein modifying at least one parameter of at least one etching process used to form gate electrode structures on a subsequently processed substrate comprises modifying at least one parameter of a two-step etching process.

16. The method of claim 8, wherein providing a library of optical characteristic traces comprises providing a library of optical characteristic traces, each of which correspond to a grating structure comprised of a plurality of gate electrodes having a profile that corresponds to an anticipated profile for said gate electrode structures.

17. The method of claim 8, wherein said grating structure formed above said provided substrate is formed in an area having dimensions of approximately 100×120 $\mu$m.

18. A method of determining gate electrode profiles, comprising:

providing a library of optical characteristic traces, each of which correspond to a grating structure comprised of a plurality of gate electrode structures having a known profile, each of a first plurality of said traces corresponding to a grating structure comprised of gate electrode structures having a profile that exhibits undercutting, and each of a second plurality of said traces corresponding to a grating structure comprised of gate electrode structures having a profile that exhibits footing;

providing a substrate having at least one grating structure formed thereabove, said formed grating structure comprised of a plurality of gate electrode structures having an unknown profile;

illuminating said grating structure formed above said substrate;

measuring light reflected off of said grating structure to generate an optical characteristic trace for said formed grating structure;

determining a profile of said gate electrode structures comprising said formed grating structure by correlating said generated optical characteristic trace to an optical characteristic trace from said library; and modifying at least one parameter of at least one etching process used to form gate electrode structures on a subsequently processed substrate based upon the determined profile of said gate electrode structures comprising said formed grating structure.

19. The method of claim 18, wherein providing a substrate having at least one grating structure formed thereabove comprises providing a substrate having at least one grating structure formed in a scribe line of said substrate.

20. The method of claim 18, wherein providing a substrate having at least one grating structure formed thereabove comprises providing a substrate having at least one grating structure formed in a production die formed above said substrate.

21. The method of claim 18, wherein providing a substrate having at least one grating structure formed thereabove comprises providing a substrate having a plurality of grating structures formed thereabove.

22. The method of claim 18, wherein modifying at least one parameter of at least one etching process used to form gate electrode structures on a subsequently processed substrate comprises modifying at least one of a gas composition, a gas flow rate, a temperature, a pressure and a duration of said at least one etching process.

23. The method of claim 18, wherein modifying at least one parameter of at least one etching process used to form gate electrode structures on a subsequently processed substrate comprises modifying a duration of at least one of a main etch process and a soft landing etch process.

24. The method of claim 18, wherein modifying at least one parameter of at least one etching process used to form gate electrode structures on a subsequently processed substrate comprises modifying at least one parameter of a two-step etching process.

25. The method of claim 18, wherein providing a library of optical characteristic traces comprises providing a library of optical characteristic traces, each of which correspond to a grating structure comprised of a plurality of gate electrodes having a profile that corresponds to an anticipated profile for said gate electrode structures.

26. The method of claim 18, wherein said grating structure formed above said provided substrate is formed in an area having dimensions of approximately 100×120 $\mu$m.

27. A method of determining gate electrode profiles, comprising:

providing a library of optical characteristic traces, each of which correspond to a grating structure comprised of a plurality of gate electrode structures having a known profile, each of a first plurality of said traces corresponding to a grating structure comprised of gate electrode structures having a profile that exhibits undercutting, and each of a second plurality of said traces corresponding to a grating structure comprised of gate electrode structures having a profile that exhibits footing;

providing a substrate having at least one grating structure formed thereabove, said formed grating structure comprised of a plurality of gate electrode structures having an unknown profile;

illuminating said grating structure formed above said substrate;

measuring light reflected off of said grating structure to generate an optical characteristic trace for said formed grating structure;

determining a profile of said gate electrode structures comprising said formed grating structure by correlating said generated optical characteristic trace to an optical characteristic trace from said library; and modifying at least one parameter of at least a two-step etching process used to form gate electrode structures on a subsequently processed substrate based upon the determined profile of said gate electrode structures comprising said formed grating structure.

28. The method of claim 27, wherein providing a substrate having at least one grating structure formed thereabove comprises providing a substrate having at least one grating structure formed in a scribe line of said substrate.

29. The method of claim 27, wherein providing a substrate having at least one grating structure formed thereabove comprises providing a substrate having at least one grating structure formed in a production die formed above said substrate.

30. The method of claim 27, wherein providing a substrate having at least one grating structure formed thereabove comprises providing a substrate having a plurality of grating structures formed thereabove.

31. The method of claim 27, wherein modifying at least one parameter of at least a two-step etching process used to form gate electrode structures on a subsequently processed substrate comprises modifying at least one of a gas composition, a gas flow rate, a temperature, a pressure and a duration of said at least two-step etching process.

32. The method of claim 27, wherein modifying at least one parameter of at least one etching process used to form gate electrode structures on a subsequently processed substrate comprises modifying a duration of at least one of a main etch process and a soft landing etch process.

33. The method of claim 27, wherein providing a library of optical characteristic traces comprises providing a library of optical characteristic traces, each of which correspond to a grating structure comprised of a plurality of gate electrodes having a profile that corresponds to an anticipated profile for said gate electrode structures.

34. The method of claim 27, wherein said grating structure formed above said provided substrate is formed in an area having dimensions of approximately 100×120 $\mu$m.

35. A method, comprising:

providing a library comprised of at least one optical characteristic trace, one of which is a target trace that corresponds to a grating structure comprised of a plurality of gate electrode structures having a known target profile;

providing a substrate having at least one grating structure formed thereabove, said formed grating structure comprised of a plurality of gate electrode structures having an unknown profile;

illuminating said grating structure formed above said substrate;

measuring light reflected off of said grating structure to generate an optical characteristic trace for said formed grating structure;

comparing said generated optical characteristic trace to said target trace; and determining, based upon said comparison of said generated optical characteristic trace and said target trace, at least one parameter of at least one etching process used to form gate electrode structures on a substantially processed substrate.

36. A method, comprising:

providing a library comprised of at least one optical characteristic trace, one of which is a target trace that corresponds to a grating structure comprised of a plurality of gate electrode structures having a known target profile;

providing a substrate having at least one grating structure formed thereabove, said formed grating structure comprised of a plurality of gate electrode structures having an unknown profile;

illuminating said grating structure formed above said substrate;

measuring light reflected off of said grating structure to generate an optical characteristic trace for said formed grating structure;

comparing said generated optical characteristic trace to said target trace; and modifying, based upon said comparison of said generated optical characteristic trace and said target trace, at least one parameter of at least one etching process used to form gate electrode structures on a subsequently processed substrate.

37. A method, comprising:

providing a library comprised of at least one optical characteristic trace, one of which is a target trace that corresponds to a grating structure comprised of a plurality of gate electrode structures having a known target profile, wherein said target trace corresponds to a grating structure comprised of a plurality of gate electrodes exhibiting substantially no undercutting;

providing a substrate having at least one grating structure formed thereabove, said formed grating structure comprised of a plurality of gate electrode structures having an unknown profile;

illuminating said grating structure formed above said substrate;

measuring light reflected off of said grating structure to generate an optical characteristic trace for said formed grating structure; and comparing said generated optical characteristic trace to said target trace.

38. A method, comprising:

providing a library comprised of at least one optical characteristic trace, one of which is a target trace that corresponds to a grating structure comprised of a plurality of gate electrode structures having a known target profile, wherein said target trace corresponds to a grating structure comprised of a plurality of gate electrodes exhibiting substantially no footing;

providing a substrate having at least one grating structure formed thereabove, said formed grating structure comprised of a plurality of gate electrode structures having an unknown profile;

illuminating said grating structure formed above said substrate;

measuring light reflected off of said grating structure to generate an optical characteristic trace for said formed grating structure; and comparing said generated optical characteristic trace to said target trace.

39. A method, comprising:

providing a library comprised of a plurality of optical characteristic traces, one of which is a target trace that corresponds to a grating structure comprised of a plurality of gate electrode structures having a known target profile, each of a first plurality of said traces corresponding to a grating structure comprised of gate electrode structures having a profile that exhibits undercutting, and each of a second plurality of said traces corresponding to a grating structure comprised of gate electrode structures having a profile that exhibits footing;

providing a substrate having at least one grating structure formed thereabove, said formed grating structure comprised of a plurality of gate electrode structures having an unknown profile;

illuminating said grating structure formed above said substrate;

measuring light reflected off of said grating structure to generate an optical characteristic trace for said formed grating structure; and comparing said generated optical characteristic trace to said target trace.

40. A method, comprising:

providing a library comprised of at least one optical characteristic trace, one of which is a target trace that corresponds to a grating structure comprised of a plurality of gate electrode structures having a known target profile;

providing a substrate having at least one grating structure formed in a scribe line of said substrate, said formed grating structure comprised of a plurality of gate electrode structures having an unknown profile;

illuminating said grating structure formed above said substrate;

measuring light reflected off of said grating structure to generate an optical characteristic trace for said formed grating structure; and comparing said generated optical characteristic trace to said target trace.

41. The method of claim 36, wherein modifying at least one parameter of at least one etching process used to form gate electrode structures on a subsequently processed substrate comprises modifying at least one of a gas composition, a gas flow rate, a temperature, a pressure and a duration of said at least one etching process.

42. The method of claim 36, wherein modifying at least one parameter of at least one etching process used to form gate electrode structures on a subsequently processed substrate comprises modifying a duration of at least one of a main etch process and a soft landing etch process.

43. The method of claim 36, wherein modifying at least one parameter of at least one etching process used to form gate electrode structures on a subsequently processed substrate comprises modifying at least one parameter of a two-step etching process.

44. A method, comprising:

providing a library comprised of at least one optical characteristic trace, one of which is a target trace that corresponds to a grating structure comprised of a plurality of gate electrode structures having a known target profile;

providing a substrate having at least one grating structure formed thereabove, wherein said grating structure formed above said provided substrate is formed in an area having dimensions of approximately 100×120 $\mu$m, said formed grating structure comprised of a plurality of gate electrode structures having an unknown profile;

illuminating said grating structure formed above said substrate;

measuring light reflected off of said grating structure to generate an optical characteristic trace for said formed grating structure; and comparing said generated optical characteristic trace to said target trace.

45. A method, comprising:

providing a library comprised of a plurality of optical characteristic traces, each of which corresponds to a grating structure comprised of a plurality of gate electrode structures having a known profile, one of which is a target trace that corresponds to a grating structure comprised of a plurality of gate electrode structures having a known target profile;

providing a substrate having at least one grating structure formed thereabove, said formed grating structure comprised of a plurality of gate electrode structures having an unknown profile;

illuminating said grating structure formed above said substrate;

measuring light reflected off of said grating structure to generate an optical characteristic trace for said formed grating structure;

comparing said generated optical characteristic trace to said target trace;

determining a profile of said gate electrode structures comprising said formed grating structure by correlating said generated optical characteristic trace to an optical characteristic trace from said library; and modifying at least one parameter of at least one etching process used to form gate electrode structures on a subsequently processed substrate based upon the determined profile of said gate electrode structures comprising said formed grating structure.

46. A method, comprising:

providing a library comprised of at least one optical characteristic trace, one of which is a target trace that corresponds to a grating structure comprised of a plurality of gate electrode structures having a known target profile;

providing a substrate having at least one grating structure formed thereabove, said formed grating structure comprised of a plurality of gate electrode structures having an unknown profile;

illuminating said grating structure formed above said substrate;

measuring light reflected off of said grating structure to generate an optical characteristic trace for said formed grating structure;

comparing said generated optical characteristic trace to said target trace; and determining, based upon said comparison of said generated optical characteristic trace and said target trace, at least one parameter of at least one etching process used to form gate electrode structures on a subsequently processed substrate.

47. The method of claim 46, further comprising modifying, based upon said comparison of said generated optical characteristic trace and said target trace, at least one parameter of at least one etching process used to form gate electrode structures on a subsequently processed substrate.

48. The method of claim 46, wherein said target trace corresponds to a grating structure comprised of a plurality of gate electrodes exhibiting substantially no undercutting.

49. The method of claim 46, wherein said target trace corresponds to a grating structure comprised of a plurality of gate electrodes exhibiting substantially no footing.

50. The method of claim 46, wherein providing a library comprised of at least one optical characteristic trace comprises providing a library comprised of a plurality of optical characteristic traces, each of a first plurality of said traces corresponding to a grating structure comprised of gate electrode structures having a profile that exhibits undercutting, and each of a second plurality of said traces corresponding to a grating structure comprised of gate electrode structures having a profile that exhibits footing.

51. The method of claim 46, wherein providing a substrate having at least one grating structure formed thereabove comprises providing a substrate having at least one grating structure formed in a scribe line of said substrate.

52. The method of claim 46, wherein providing a substrate having at least one grating structure formed thereabove comprises providing a substrate having at least one grating structure formed in a production die formed above said substrate.

53. The method of claim 46, wherein providing a substrate having at least one grating structure formed thereabove comprises providing a substrate having a plurality of grating structures formed thereabove.

54. The method of claim 47, wherein modifying at least one parameter of at least one etching process used to form gate electrode structures on a subsequently processed substrate comprises modifying at least one of a gas composition, a gas flow rate, a temperature, a pressure and a duration of said at least one etching process.

55. The method of claim 47, wherein modifying at least one parameter of at least one etching process used to form gate electrode structures on a subsequently processed substrate comprises modifying a duration of at least one of a main etch process and a soft landing etch process.

56. The method of claim 47, wherein modifying at least one parameter of at least one etching process used to form gate electrode structures on a subsequently processed substrate comprises modifying at least one parameter of a two-step etching process.

57. The method of claim 46, wherein providing a library comprised of at least one optical characteristic trace comprises providing a library comprised of a plurality of optical characteristic traces, each of which correspond to a grating structure comprised of a plurality of gate electrodes having a profile that corresponds to an anticipated profile for said gate electrode structures.

58. The method of claim 46, wherein said grating structure formed above said provided substrate is formed in an area having dimensions of approximately 100×120 $\mu$m.

59. The method of claim 46, wherein said library comprises a plurality of optical characteristic traces, each of which correspond to a grating structure comprised of a plurality of gate electrode structures having a known profile.

60. The method of claim 46, further comprising comparing the generated trace and the target trace and performing additional matching of said generated trace to at least one additional optical characteristic trace from said library if the difference between said generated trace and said target trace exceeds a preselected value.

61. The method of claim 59, further comprising:

determining a profile of said gate electrode structures comprising said formed grating structure by correlating said generated optical characteristic trace to an optical characteristic trace from said library; and modifying at least one parameter of at least one etching process used to form gate electrode structures on a subsequently processed substrate based upon the determined profile of said gate electrode structures comprising said formed grating structure.

62. A method, comprising:

providing a library comprised of at least one optical characteristic trace, one of which is a target trace that corresponds to a grating structure comprised of a plurality of gate electrode structures having a known target profile;

providing a substrate having at least one grating structure formed thereabove, said formed grating structure comprised of a plurality of gate electrode structures having an unknown profile;

illuminating said grating structure formed above said substrate;

measuring light reflected off of said grating structure to generate an optical characteristic trace for said formed grating structure;

comparing said generated optical characteristic trace to said target trace; and modifying, based upon said comparison of said generated optical characteristic trace and said target trace, at least one parameter of at least one etching process used to form gate electrode structures on a subsequently processed substrate.

63. The method of claim 62, further comprising determining, based upon said comparison of said generated optical characteristic trace and said target trace, at least one parameter of at least one etching process used to form gate electrode structures on a subsequently processed substrate.

64. The method of claim 62, wherein said target trace corresponds to a grating structure comprised of a plurality of gate electrodes exhibiting substantially no undercutting.

65. The method of claim 62, wherein said target trace corresponds to a grating structure comprised of a plurality of gate electrodes exhibiting substantially no footing.

66. The method of claim 62, wherein providing a library comprised of at least one optical characteristic trace comprises providing a library comprised of a plurality of optical characteristic traces, each of a first plurality of said traces corresponding to a grating structure comprised of gate electrode structures having a profile that exhibits undercutting, and each of a second plurality of said traces corresponding to a grating structure comprised of gate electrode structures having a profile that exhibits footing.

67. The method of claim 62, wherein providing a substrate having at least one grating structure formed thereabove comprises providing a substrate having at least one grating structure formed in a scribe line of said substrate.

68. The method of claim 62, wherein providing a substrate having at least one grating structure formed thereabove comprises providing a substrate having at least one grating structure formed in a production die formed above said substrate.

69. The method of claim 62, wherein providing a substrate having at least one grating structure formed thereabove comprises providing a substrate having a plurality of grating structures formed thereabove.

70. The method of claim 62, wherein modifying at least one parameter of at least one etching process used to form gate electrode structures on a subsequently processed substrate comprises modifying at least one of a gas composition, a gas flow rate, a temperature, a pressure and a duration of said at least one etching process.

71. The method of claim 62, wherein modifying at least one parameter of at least one etching process used to form gate electrode structures on a subsequently processed substrate comprises modifying a duration of at least one of a main etch process and a soft landing etch process.

72. The method of claim 62, wherein modifying at least one parameter of at least one etching process used to form gate electrode structures on a subsequently processed substrate comprises modifying at least one parameter of a two-step etching process.

73. The method of claim 62, wherein providing a library comprised of at least one optical characteristic trace comprises providing a library comprised of a plurality of optical characteristic traces, each of which correspond to a grating structure comprised of a plurality of gate electrodes having a profile that corresponds to an anticipated profile for said gate electrode structures.

74. The method of claim 62, wherein said grating structure formed above said provided substrate is formed in an area having dimensions of approximately 100×120 $\mu$m.

75. The method of claim 62, wherein said library comprises a plurality of optical characteristic traces, each of which correspond to a grating structure comprised of a plurality of gate electrode structures having a known profile.

76. The method of claim 62, further comprising comparing the generated trace and the target trace and performing additional matching of said generated trace to at least one additional optical characteristic trace from said library if the difference between said generated trace and said target trace exceeds a preselected value.

77. The method of claim 75, further comprising:
   determining a profile of said gate electrode structures comprising said formed grating structure by correlating said generated optical characteristic trace to an optical characteristic trace from said library; and
   modifying at least one parameter of at least one etching process used to form gate electrode structures on a subsequently processed substrate based upon the determined profile of said gate electrode structures comprising said formed grating structure.

* * * * *